(12) United States Patent
Kinoshita et al.

(10) Patent No.: US 7,880,816 B2
(45) Date of Patent: Feb. 1, 2011

(54) INPUT SWITCHING APPARATUS AND TELEVISION APPARATUS

(75) Inventors: Kosuke Kinoshita, Daito (JP); Kentaro Eto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1257 days.

(21) Appl. No.: 11/329,848

(22) Filed: Jan. 11, 2006

(65) Prior Publication Data

US 2006/0158838 A1 Jul. 20, 2006

(30) Foreign Application Priority Data

Jan. 18, 2005 (JP) ............................. 2005-010707

(51) Int. Cl.
*H04N 5/50445* (2006.01)
(52) U.S. Cl. ...................... 348/705; 348/563; 348/564; 348/569; 348/706
(58) Field of Classification Search ................. 348/563, 348/564, 569, 705, 706
See application file for complete search history.

(56) References Cited

U.S. PATENT DOCUMENTS

| | | | | |
|---|---|---|---|---|
| 5,416,535 A | * | 5/1995 | Sato et al. .................... | 348/706 |
| 5,488,427 A | * | 1/1996 | Kayashima et al. ......... | 348/569 |
| 5,722,041 A | * | 2/1998 | Freadman .................... | 725/82 |
| 5,912,668 A | * | 6/1999 | Sciammarella et al. ...... | 715/788 |
| 5,917,557 A | * | 6/1999 | Toyoda ........................ | 348/705 |
| 5,973,691 A | * | 10/1999 | Servan-Schreiber ......... | 715/803 |
| 6,097,441 A | * | 8/2000 | Allport ........................ | 348/552 |
| 6,127,941 A | * | 10/2000 | Van Ryzin ............. | 340/825.69 |
| 6,141,003 A | * | 10/2000 | Chor et al. .................. | 715/719 |
| 6,384,869 B1 | * | 5/2002 | Sciammarella et al. ...... | 348/564 |
| 6,396,544 B1 | * | 5/2002 | Schindler et al. ............ | 348/461 |
| 6,510,452 B1 | * | 1/2003 | Brisebois et al. ............ | 709/204 |
| 6,593,941 B1 | * | 7/2003 | Sameshima .................. | 715/716 |
| 6,753,928 B1 | * | 6/2004 | Gospel et al. ............... | 348/569 |

(Continued)

FOREIGN PATENT DOCUMENTS

JP   03-058681   3/1991

(Continued)

OTHER PUBLICATIONS

Patent Abstracts of Japan, Application No. 2001-309249, dated Nov. 2, 2001 (1 page).

(Continued)

*Primary Examiner*—Brian Yenke
(74) *Attorney, Agent, or Firm*—Osha Liang LLP (57) ABSTRACT

On a display unit, icons representing types of video signals supplied to respective ones of a plurality of input terminals are displayed. When a user operates a remote and selects an icon representing the type of desired video signal, a video image derived from the video signal of the desired type supplied to the input terminal that corresponds to the selected icon is displayed on the display unit. In such a situation, arrangement of icons on the display unit can be changed by a user instruction given by an operation of the remote. Further, the icons also show shapes of the input terminals, and therefore, the user can easily confirm to which input terminal of which shape the device supplying the video signal of the type indicated by the icon is to be connected.

4 Claims, 5 Drawing Sheets

U.S. PATENT DOCUMENTS

| | | | |
|---|---|---|---|
| 6,791,467 B1 * | 9/2004 | Ben-Ze'ev | 340/825.69 |
| 6,825,858 B2 * | 11/2004 | Sato | 715/735 |
| 6,918,136 B2 * | 7/2005 | Shepherd | 725/141 |
| 6,993,725 B2 * | 1/2006 | Somashekaraiah | 715/811 |
| 2002/0060676 A1 * | 5/2002 | Kim | 345/212 |
| 2002/0167617 A1 * | 11/2002 | Vornsand | 348/734 |
| 2003/0011467 A1 * | 1/2003 | Suomela | 340/7.1 |
| 2005/0154574 A1 * | 7/2005 | Takemura et al. | 703/22 |
| 2007/0300188 A1 * | 12/2007 | Kim | 715/835 |

FOREIGN PATENT DOCUMENTS

| | | |
|---|---|---|
| JP | 3050205 | 4/1998 |
| JP | 10-304260 | 11/1998 |
| JP | 2000-188725 | 7/2000 |
| JP | 2001-309249 | 11/2001 |
| JP | 2004-129236 | 4/2004 |

OTHER PUBLICATIONS

Patent Abstracts of Japan, Application No. 10-304260, dated Nov. 13, 1998 (1 page).

Patent Abstracts of Japan, Application No. 03-058681, dated Mar. 13, 1991 (1 page).

Japanese Notice of Grounds of Rejection for Patent Application No. 010707/2005, mailed Apr. 20, 2010, and English translation thereof, 6 pages.

Patent Abstracts of Japan for patent application with Publication No. 2004-129236, Publication Date: Apr. 22, 2004, 1 page.

Patent Abstracts of Japan for patent application with Publication No. 2000-188725, Publication Date: Apr. 7, 2000, 1 page.

* cited by examiner

| | 51 | 52 | 53 | 54 | 5 |
|---|---|---|---|---|---|
| | INPUT TERMINAL | INPUT NAME | SHAPE OF TERMINAL | DISPLAY POSITION | |
| | I1 | 'COMPONENT' | | (X1,Y1) | |
| | I2 | 'DVI' | | (X2,Y2) | |
| | I3 | 'VIDEO1' | | (X3,Y3) | |
| | I4 | 'VIDEO2' | | (X4,Y4) | |
| | ⋮ | ⋮ | ⋮ | ⋮ | |

INPUT SWITCHING APPARATUS AND TELEVISION APPARATUS

BACKGROUND OF THE INVENTION

1. Field of the Invention

The present invention relates to an input switching apparatus and a television apparatus and, more specifically, to an input switching apparatus and a television apparatus providing a function of switching video signal inputs, utilizing a display unit of video signals received through a receiver circuit.

2. Description of the Background Art

Figure 7:
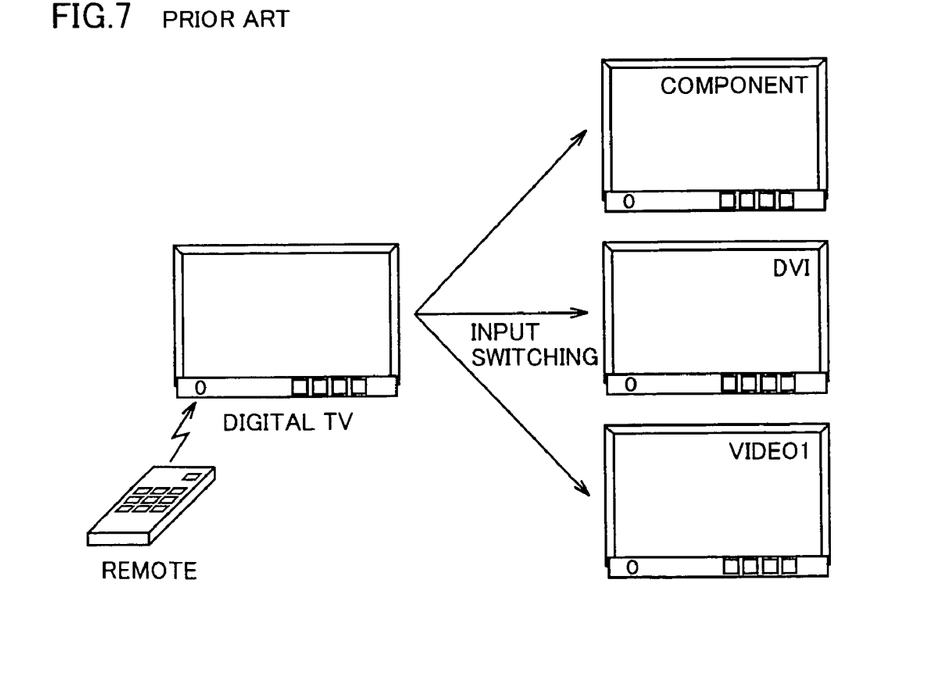
FIG. 7 illustrates an example of conventional display for input switching.

In a digital television, when an input switching key on a remote (remote controller) or on the main body is pressed, the name of the selected input is displayed by characters on the display screen, as shown in FIG. 7. When a plurality of AV (Audio-Visual) devices are connected to a digital television, however, it is difficult simply by the input name to know which AV device corresponds to which input. Further, for a user not very familiar with terminal names, it is difficult, by the display of input name only, to find which terminal should be used for connection with another AV device.

In connection with the operation of switching the input to a digital television, there has been a demand especially among those who not accustomed to operations of such equipment, such as elderlies or children, for a selection not by the names of the input devices but by indicating the actual devices laid-out in the room, which selection is considered much easier.

With such a background, Japanese Patent Laying-Open No. 2001-309249 provides a function of realizing easy confirmation of connecting state of an external unit connected to an input terminal and realizing a simple operation of a remote controller or the like.

Japanese Patent Laying-Open No. 10-304260 provides a function of easily attaining switching to an objective device by detecting the connecting state of a plurality of AV devices connected to a plurality of external input terminals, changing an on-screen display method dependent on presence/absence of the AV device, and by moving a cursor for input switching among the AV devices.

Further, Japanese Patent Laying-Open No. 03-58681 provides a function of easily confirming the connecting state of a connection terminal by providing a connection information discrimination section for an external terminal and using a remote control signal for providing on-screen display.

Japanese Utility Model Registration No. 3050205 discloses an on-screen display control unit that provides a display of a character, figure or symbol indicating that an external input has been switched, on the background of a uniform color, on the screen of a connected video display apparatus.

According to Japanese Patent Laying-Open No. 2001-309249, it is made possible for the user to set the name of an input terminal for the device to be connected in accordance with the on-screen display, and the devices to be connected are displayed in the form of a list. The input devices, however, are displayed not in correspondence to the layout of AV devices in the room, and therefore, the demand by those who not accustomed to the operation of such devices can not be satisfied.

In Japanese Patent Laying-Open No. 10-304260, whether an AV device is connected to a TV receiver or not is indicated by changing the color of display. Specifically, the name of a connected AV device is simply indicated in a color different from the name of an un-connected AV device. Therefore, the demand by those who not accustomed to the operation of such devices can not be satisfied, either.

In Japanese Patent Laying-Open No. 03-58681, state of connection of connection terminals of the TV receiver, polarity of various switches and the like are displayed as a list. The display, however, is not in correspondence to the layout of AV devices in the room, and therefore, the demand by those who not accustomed to the operation of such devices can not be satisfied.

Japanese Utility Model Registration No. 3050205 simply notifies the state of switching of external inputs by on-screen display of characters and figures, and the display is not in correspondence to the layout of AV devices in the room, either. Therefore, the demand by those who not accustomed to the operation of such devices can not be satisfied.

SUMMARY OF THE INVENTION

An object of the present invention is to provide an input switching apparatus and a television apparatus that can easily and reliably switch the input source of video signals.

In order to attain the above-described object, the present invention provides an input switching apparatus selectively switching, among video signals supplied to respective ones of a plurality of input terminals, a desired video signal to be input. Specifically, the input switching apparatus includes: a display unit; a picture display unit for displaying, for each input terminal, a picture indicating the type of video signal supplied to the input terminal on the display unit; a selective input unit for inputting a video signal supplied to that input terminal which corresponds to the picture selected based on an external instruction, among the pictures displayed by the picture display unit; and a video display unit processing the video signal input through the selective input unit and displaying a video image derived from the processed video signal on the display unit; wherein the picture display unit includes a rearrangement unit for rearranging the pictures displayed on the display unit, in accordance with an external operation instruction.

According to another aspect of the present invention, the picture indicates not only the type of the video signal but also the shape of the corresponding input terminal. According to a still another aspect of the present invention, the picture is given as an icon.

According to the invention, for the plurality of input terminals, pictures indicating the types of video signals supplied to the respective terminals are displayed on the display unit. When a user externally selects a picture indicating the type of the desired video signal, a video image derived from the video signal of the desired type supplied to the input terminal corresponding to the selected picture is displayed. Here, the arrangement of pictures on the display unit can be changed as desired, by an external user operation.

Therefore, the arrangement of pictures can be changed to match the layout of external AV devices supplying the video signals of the types represented by the pictures, and therefore, it is possible to switch the input source by selecting the picture, in a manner as if the input source of video signals were switched among the actual AV devices laid-out in the room, realizing easy operation. Therefore, even a user who is not accustomed to operations of such equipment, such as an elderly or a child, can switch the input source to have the desired type of video signal, simply by selecting the picture displayed on the display unit, in the same manner as to select a desired device among the actually laid-out AV devices.

Further, the picture also shows the shape of the input terminal, and therefore, it can readily be understood as to which input terminal of which shape the device supplying the video signal of the type represented by the picture should be connected. Therefore, even a user who does not know the combination between a device and the corresponding terminal can connect an appropriate device corresponding to each input terminal without making any erroneous connection.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described with reference to the figures. Here, an example in which an external AV device is connected to a digital TV (television) receiver, and a video image based on video information supplied from the connected external AV device is displayed on the digital TV receiver will be described. The device for display, however, is not limited to the digital TV receiver.

Figure 1:
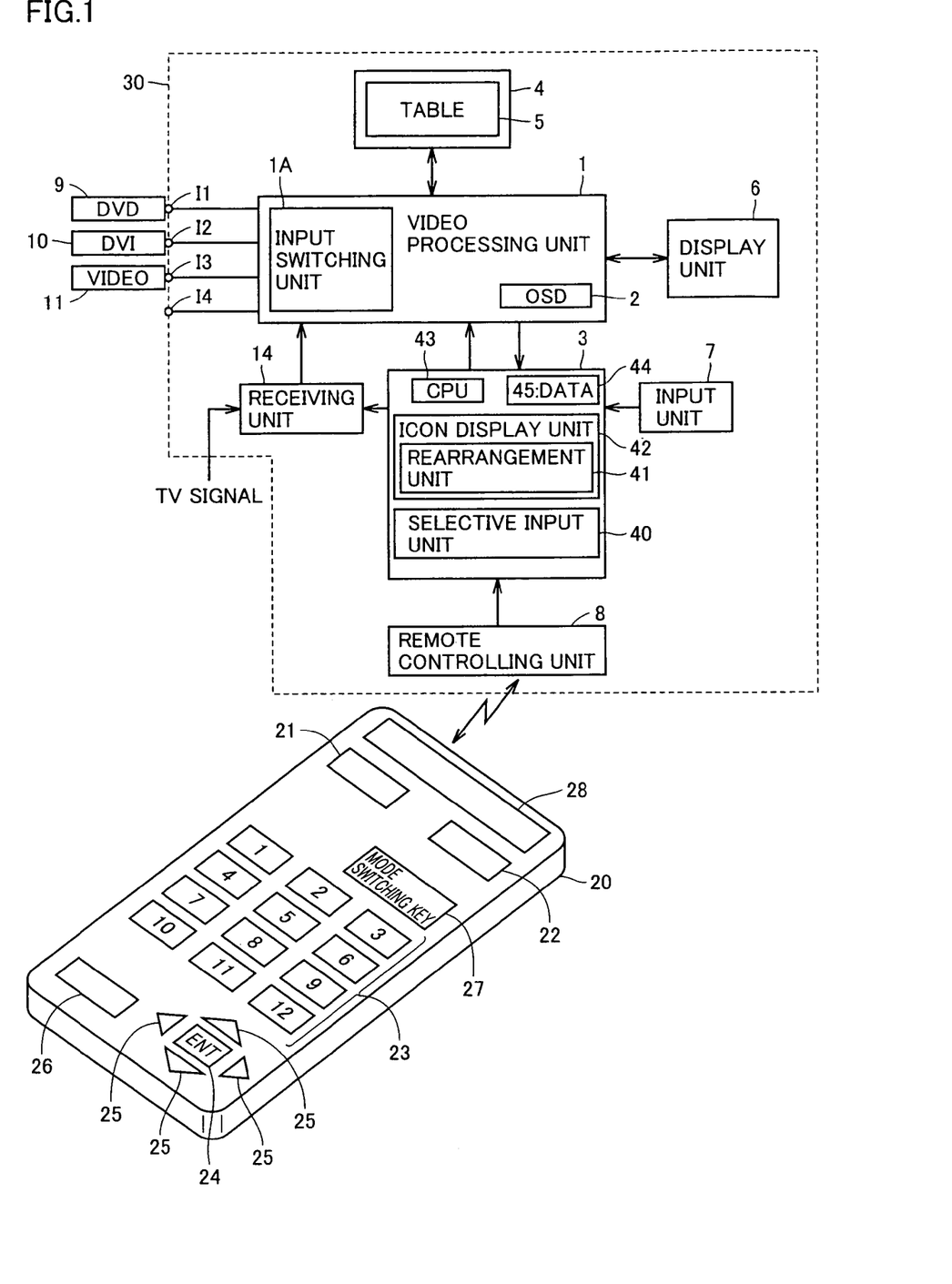
FIG. 1 shows a system configuration in accordance with an embodiment of the present invention.
Figure 2:
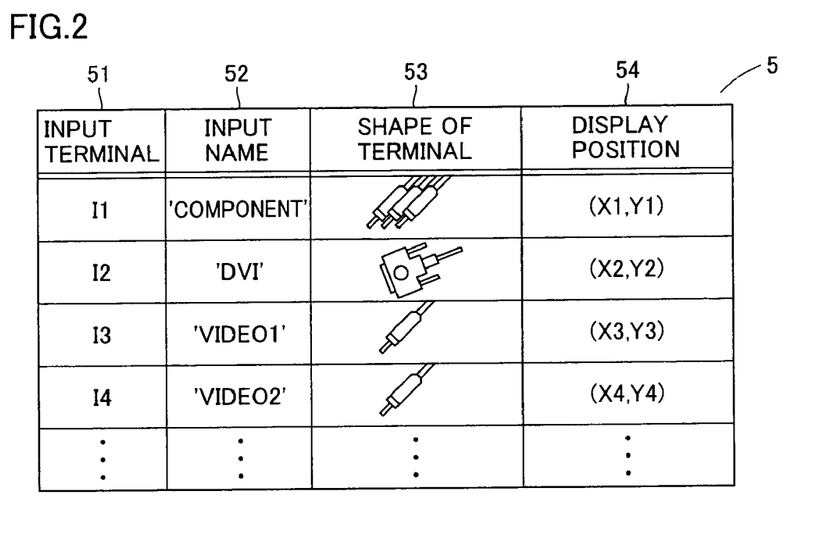
FIG. 2 shows exemplary contents of a table in accordance with an embodiment of the present invention.
Figure 3:
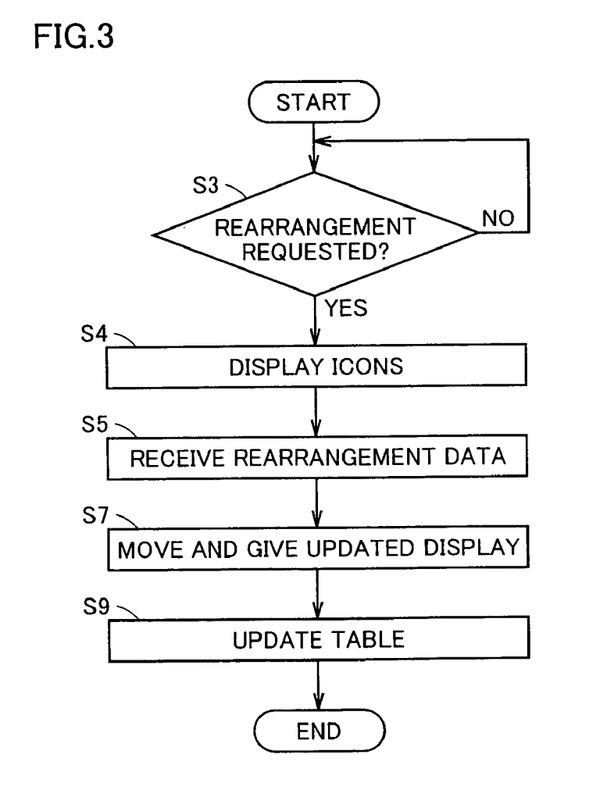
FIG. 3 is a flow chart representing process steps in accordance with an embodiment of the present invention.
Figure 4:
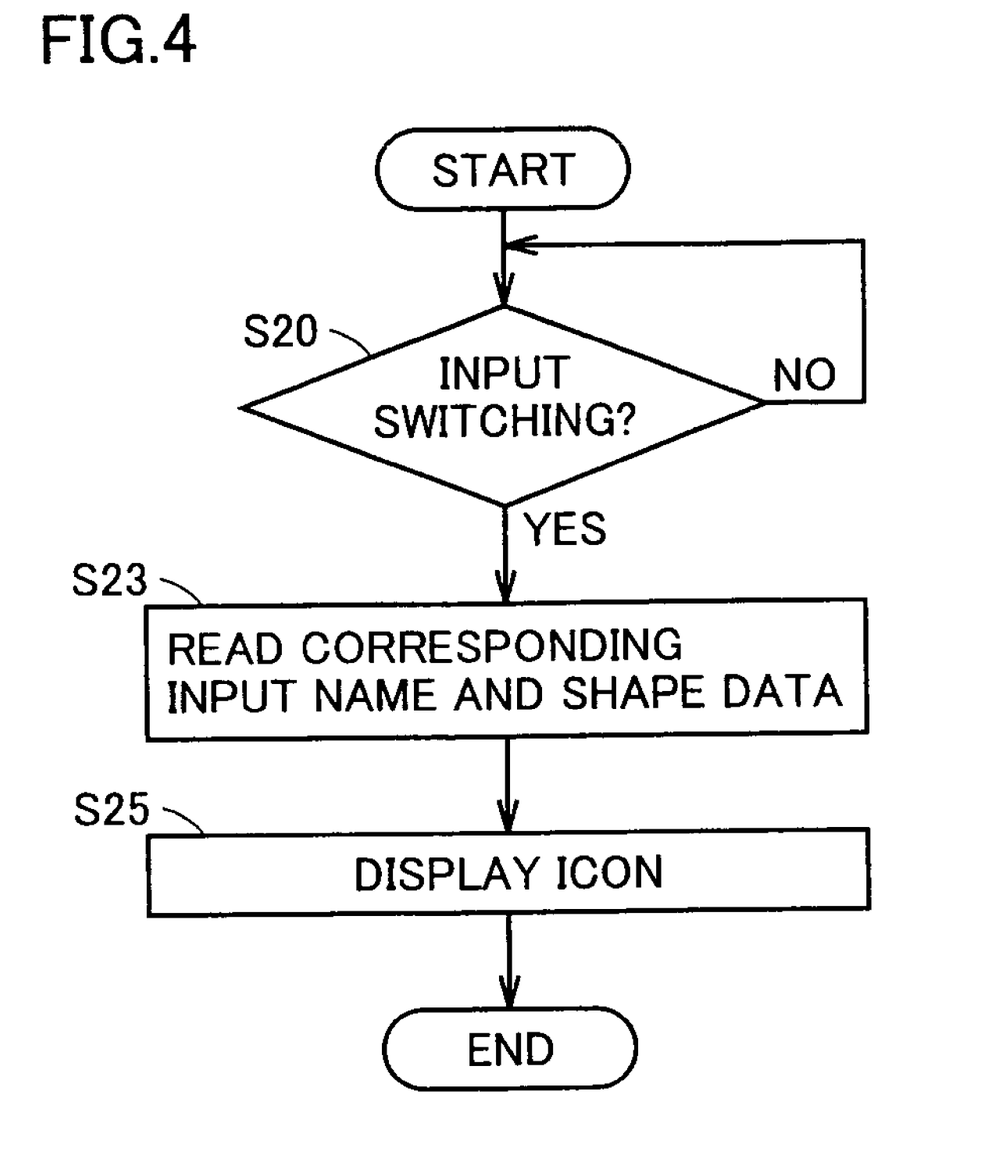
FIG. 4 is a flow chart representing process steps in accordance with another embodiment of the present invention.

FIG. 1 shows a configuration of the system in accordance with the present embodiment, FIG. 2 shows a table as a reference displaying the state of connection of external AV devices, and FIGS. 3 and 4 show process steps in the form of flow charts. FIGS. 5A to 5C and FIG. 6 show exemplary displays representing the state of connection of external AV devices.

In the present embodiment, a plurality of different types of AV devices can be connected to a digital TV receiver 30. Here, as the plurality of different types of AV devices, a game machine 12, and a DVD apparatus 9, a DVI (Digital Visual Interface) apparatus 10 and a video cassette apparatus 11 housed in an AV rack 15 are shown as examples. The external AV device connected to digital TV receiver 30, supplying AV signals and providing outputs through digital TV receiver 30 is not limited to these, and, by way of example, an antenna for receiving a TV signal may be included.

Figure 5A:
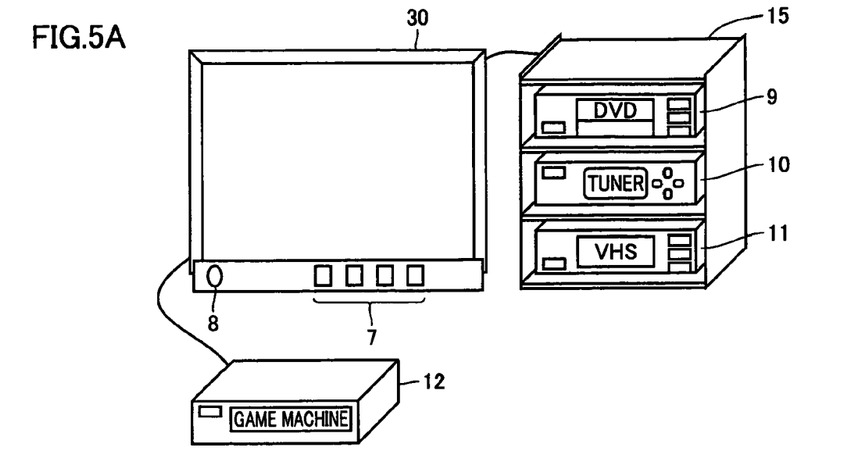
FIGS. 5A to 5C represent a layout of AV devices and exemplary display of icons in accordance with an embodiment of the present invention.
Figure 5B:
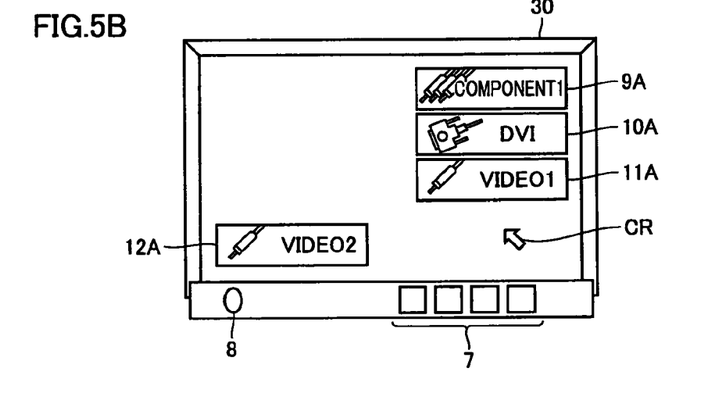

In the present embodiment, on the screen of digital TV receiver 30, the state of connection of AV devices is displayed, in accordance with the actual layout of the AV devices in the room. For example, for the AV device contained in AV rack 15 as one faces of digital TV receiver 30 as shown in FIG. 5A, icons 9A to 11A including combinations of the input names of the AV devices and the pictures of corresponding input terminals are displayed in accordance with the order of arrangement (layout) in the AV rack 15, on the right side of the screen, as shown in FIG. 5B. In FIG. 5A, game machine 12 is laid-out on the left side of digital TV receiver 30, an icon 12A including the combination of the input name of the AV device, that is, the game machine 12, and the picture of the input terminal is displayed on the lower left corner of the screen in FIG. 5B. Here, it is assumed that game machine 12 and DVD apparatus 9, DVI apparatus 10 and video cassette apparatus 11 contained in AV rack 15 are respectively connected to input terminals I1 to 14 of FIG. 1. The input terminals of which shapes are indicated by the icon pictures denote terminals that are provided originally on the back or front panel of digital TV receiver 30, for inputting video signals and the like from external AV devices.

Icons 9A, 10A, 11A and 12A of FIG. 5B are selectively operated for input switching, and the input is switched to the AV device that corresponds to the operated icon. Therefore, there are the following characteristics. Specifically, when a video image from a desired AV device is to be displayed on digital TV receiver 30, it is necessary for the user to press an input switching key provided on a remote or the like, to switch to the input corresponding to the AV device. At the time of such operation, generally it is not easy to see which input to switch, in order to display the video image of the desired AV device. Here, because of the display shown in FIG. 5B, in which the layout (arrangement) of the AV devices and the arrangement of icons match, quick and reliable switching operation becomes possible.

Referring to FIG. 1, digital TV 30 is operated by a remote 20 for remote control. Digital TV receiver 30 includes a receiving unit 14 for receiving as an input a TV signal received through an antenna, not shown, and tuning the signal; a video image processing unit 1; a microcomputer 3 controlling various units; a memory 4 storing various data including a table 5, which will be described later; a display unit 6 formed of a CRT (Cathode Ray Tube), liquid crystal or the like; an input unit 7 such as an operation panel provided on a front surface of digital TV receiver 30; a remote controlling unit 8 receiving a signal from remote 20 and performing demodulation or other processing on the signal and outputting the demodulated result to microcomputer 3; and input terminals I1 to I4. Microcomputer 3 includes a memory 44, a CPU (Central Processing Unit) 43, a selective input unit 40, and an icon display unit 42 having a rearrangement unit 41. Icon display unit 42 and selective input unit 40 represent functions realized by the CPU executing a program stored in memory 44. Input terminals I1 to I4 are terminals for connecting external AV devices to digital TV receiver 30. Input terminals I1 to I4 each have a unique shape.

Video image processing unit 1 includes an input switching unit 1A and an OSD (On-Screen Display) circuit 2. OSD circuit 2 displays an image based on information applied from microcomputer 3 superposed on a video image displayed on display unit 6. Video processing unit 1 receives as an input the TV signal output from receiving unit 14 or the video signal applied through input switching unit 1A, processes the video signal and displays a video image derived from the processed video signal on display unit 6.

Input switching unit 1A operates to switch the side that inputs a signal to video processing unit 1 to any of the terminals I1 to I4 or to receiving unit 14, under the control of selective input unit 40 of microcomputer 3. In a standard (default) state, it is assumed that the input side is set to receiving unit 14.

The operation panel of remote 20 includes: a power key 21 for turning ON/OFF the power of digital TV receiver 30; an input switching key 22; a key unit 23 operated for channel switching or the like; a determination key 24 operated for determining contents of operation; a cursor key 25 operated for moving a cursor displayed on display unit 6; a rearrangement key 26; a mode switching key 27; a liquid crystal display 28 and the like.

Rearrangement key 26 is operated for rearranging the icons of AV devices shown in FIG. 5B.

Input switching key 22 is operated for switching a signal to be input to digital TV receiver 30 (video processing unit 1). Here, the TV signal from receiving unit 14 and input signals from input terminals I1 to I4 are the candidates for the input signal to digital TV receiver 30, and input switching key 22 is operated for selectively switching to one signal from these input signal candidates. For instance, assuming the default input state, the external signal input source can be switched in the order of the signal from input terminal I1→signal from input terminal I2→signal from input terminal I3→signal from input terminal I4→TV signal→signal from input terminal I1, and so on, every time the input switching key is operated.

The operation signal indicating the contents of instruction by the operation of remote 20 is subjected to infrared modulation and transmitted from remote 20 to digital TV receiver 30. Therefore, remote controlling unit 8 receives the modulated signal, demodulates the received signal, and outputs the result to microcomputer 3.

Based on the input operation signal, microcomputer 3 controls various other units. For instance, when the operation signal is for switching input, it switches, using selective input unit 40, the source of signal input from the current one to the next source. Specifically, if a TV signal is being input at present, the input is switched to the signal from input terminal I1, and if the source of signal input is input terminal I1 at present, the input is switched to the signal from input terminal I2. Data 45 for switching to the next input source is stored in advance in memory 44 in microcomputer 3, and it is assumed that switching is performed with reference to data 45. Data 45 includes data representing the present input source and data related to the order of switching.

The information of table 5 shown in FIG. 2 represents the information that is referred to by icon display unit 42 of microcomputer 3, for giving the display shown in FIG. 5B and for switching the input source. Table 5 includes, for each of the input terminals 51 (input terminal I1 to I4) of digital TV receiver 30, input name data 52, terminal shape data 53 for displaying the picture indicating the shape of corresponding input terminal, and display position data 54 indicating the display position of the icon on display unit 6. By the input name indicated by input name data 52, the type (component, DVI, VIDEO and the like) of the video signal supplied to the corresponding input terminal 51 is denoted. When different types of video signals are supplied from various AV devices, the type name of the video signal can indicate the type of the corresponding AV device. Here, it is assumed that receiving unit 14 is not registered in the table, as it is the default input source.

Icons of respective input terminals 51 are displayed as shown in FIG. 5B, by OSD circuit 2. Specifically, icon display unit 42 of microcomputer 3 generates, for each input terminal 51, image data based on the corresponding input name data 52 and the terminal shape data 53, and applies the generated image data to the OSD circuit 2 together with the corresponding display position data 54, so that the OSD circuit 2 displays an icon in accordance with the applied image data of the icon at the position of display unit 6 indicated by display position data 54.

Though the image data of the icon is described as generated based on the contents of table 5, table 5 may store the image data of icons corresponding to respective input terminals 51, and for displaying the icon, the corresponding image data may be read from table 5. Though pictures of the terminal shapes are also shown as the icons in FIG. 5B, the icons may not include the pictures of the terminal shapes.

A process of rearranging the icons on display unit 6 in accordance with the layout of AV devices will be described with reference to the flow chart of FIG. 3. Here, it is assumed that the AV devices are laid-out in the state as shown in FIG. 5A, and DVD apparatus 9, DVI apparatus 10, video cassette apparatus 11 and game machine 12 are connected to terminals I1 to I4, respectively. For simplicity of description, input switching of the antenna will not be described here.

Figure 5C:
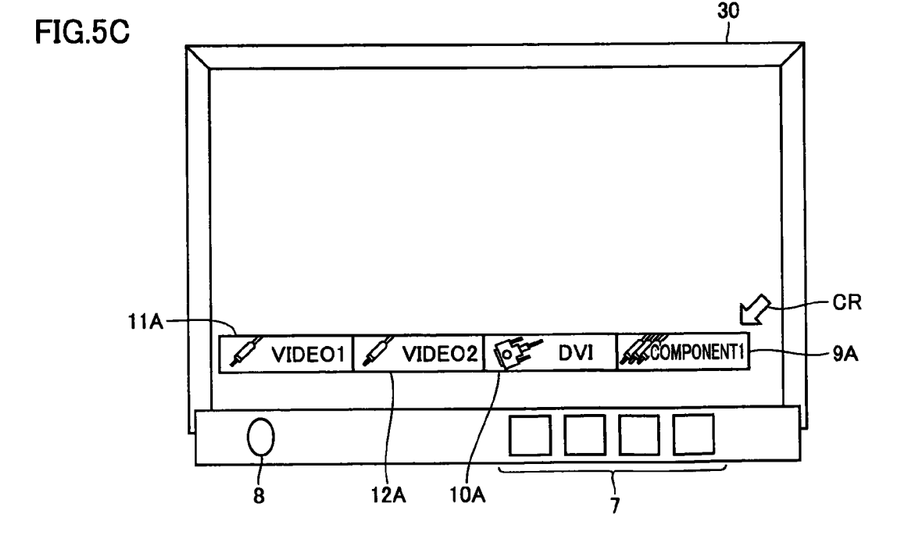

It is assumed that table 5 has data of an initial state (at the time of shipment) stored in advance. An exemplary display of icons on display unit 6 based on the data of table 5 in the initial state is as shown in FIG. 5C.

Referring to FIG. 3, when a user wishes to change (rearrange) the arrangement from the initial state to the arrangement of icons that exactly matches the layout of the AV devices in the room, the user operates the mode switch key 27 to a rearranging mode, and in response, an operation signal requesting rearrangement is transmitted from remote 20. Remote controlling unit 8 receives and demodulates the operation signal, and applies the result of demodulation to microcomputer 3.

Microcomputer 3 determines, based on the rearrangement request indicated by the received operation signal, that there is a rearrangement request (step S (hereinafter simply denoted by "S") 3).

Icon display unit 42 of microcomputer 3 reads the contents of table 5 (data of initial state) from memory 4 through video processing unit 1, generates icon data based on the read contents, and outputs the generated icon data to OSD circuit 2, together with data of the display position of the initial state. Based on the applied data, OSD circuit 2 displays icons on the position of the initial state (see FIG. 5C) on display unit 6 (S4).

Specifically, microcomputer 3 generates, for respective input terminal data 51, image data of icons based on the corresponding input name data 52 and terminal shape data 53, and outputs the generated data and the corresponding display position data 54 of the initial state to OSD circuit 2. Consequently, OSD circuit 2 displays icons based on the applied image data, on the positions of display unit 6 indicated by the also applied display position data 54. On the screen image shown in FIG. 5C, a cursor CR is also displayed by microcomputer 3 using OSD circuit 2.

The user moves the cursor CR on display unit 6 using cursor key 25, to an icon that is to be rearranged among the icons shown in FIG. 5C, and operates cursor key 25 while operating rearrangement key 26, so that the icon can be dragged and moved. When the icon is moved to a desired position and a key for releasing the operation or determination key 24 is operated, the icon is displayed, by rearrangement unit 41, at the position after movement. Microcomputer 3 receives such a series of operation signals from remote 20 (S5).

The display position on display unit 6 after movement by rearrangement unit 41, that is, the position of cursor CR, is identified by OSD circuit 2, and the identified display position data is applied to rearrangement unit 41 of microcomputer 3. Therefore, rearrangement unit 41 receives as an input the applied display position data and, using the input display position data, updates the display position data 54 corresponding to the data 51 of the input terminal of the icon in table 5 stored in memory 4.

By repeating such process steps for each icon of which movement is desired, the icons can be displayed in an arrangement matching the actual layout of the AV devices as shown in FIG. 5B, from the state of FIG. 5C.

The process of switching the input in accordance with the layout of AV devices is as follows.

When the user operates input switching key 22 of remote 20, through operations of icon display unit 42 of microcomputer 3 and OSD circuit 2, icon images such as shown in FIG. 5B are displayed, superposed on the displayed video image, on display unit 6.

Using cursor movement key 25, the user positions the cursor CR to the icon of the input name as the desired input source, and presses determination key 24. Then, the display position of the icon at the pressed point, that is, the display position of cursor CR, is identified by OSD circuit 2, and data of the identified display position is applied to selective input unit 40 of microcomputer 3. Selective input unit 40 searches for the table 5 based on the input display position data, reads the corresponding input terminal data 51, and controls input switching unit 1A so that the input source is switched to the input terminal corresponding to the read input terminal data 51.

Therefore, when the user wishes to switch the input source newly to the AV device of the second shelf from the top of AV rack 15 on the right side of digital TV receiver 30, what is necessary is simply to point the second icon from the top among the icons vertically arranged on the right side of the screen, as shown in FIG. 5B. Thus, the input source can be switched quickly and reliably.

Here, it is assumed that input terminals I1 to I4 are all connected to AV devices. If there is any input terminal that is not connected to the AV device, icon display unit 42 may display the icon of the input terminal not connected to any AV device in a manner different from the icon of the input terminal connected to the AV device. For instance, the display color of icons may be made different, or the tone of display color may be made different. By such different manner of display, the user can recognize only the actually connected AV devices as the candidates of input switching, and therefore, operation of input switching is facilitated.

Another Embodiment

Figure 6:
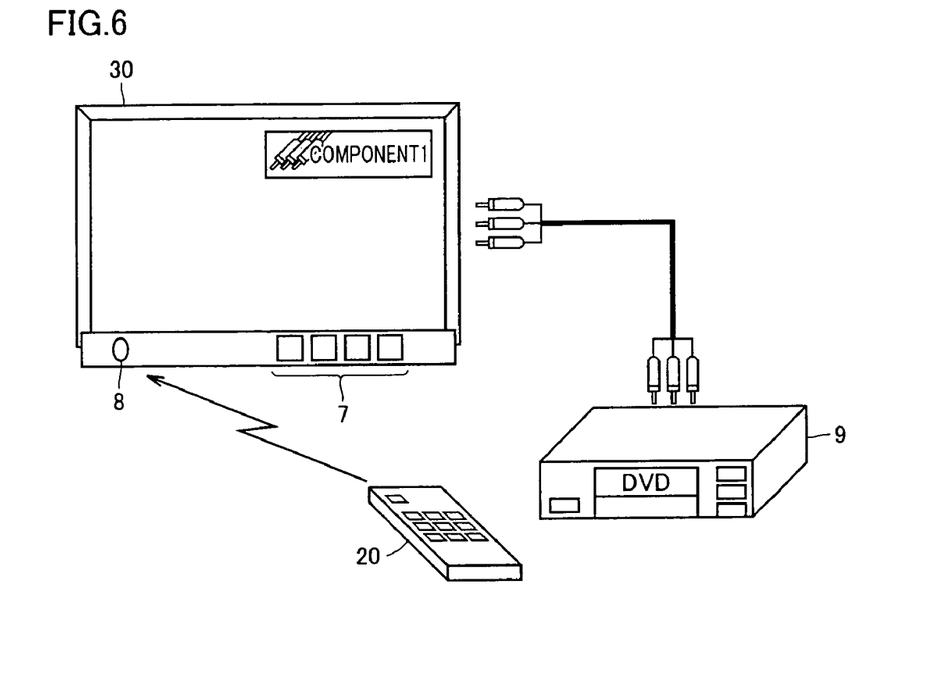
FIG. 6 shows an exemplary display on a screen at the time of input switching, in accordance with another embodiment of the present invention.

By the input switching in accordance with the process shown in FIG. 4, a display such as shown in FIG. 6 may be provided.

Referring to FIG. 4, every time the input switching key 22 of remote 20 is pressed (YES in S20), selective input unit 40 of microcomputer 3 controls input switching unit 1A such that the input source is switched from the present one to the next input source, while icon display unit 42 reads the input name data 52 and the terminal shape data 53 of the next input source from table 5, generates icon data based on the read contents, and applies the icon data and the data of the prescribed display position to OSD circuit 2. Consequently, OSD circuit 2 displays the icon on the prescribed display position of display unit 6, for example, at an upper right corner, based on the input data (S23, S25). A display example in this case is as shown in FIG. 6.

In FIG. 6, the icon displays not only the characters representing the input name as in the conventional example shown in FIG. 7 but also a picture indicating the terminal shape. Therefore, the user can recognize at one sight, which input terminal of which shape should be connected to the AV device that supplies the type of video signal indicated by the input name. Therefore, even a user who does not know the correspondence between the input terminal and the AV device to be connected can easily and reliably connect each input terminal to the AV terminal of the type that should be connected thereto.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television apparatus, comprising
a plurality of input terminals and an input switching apparatus for selectively switching, among video signals supplied to respective ones of said plurality of input terminals, a desired one of said video signals to be input,
wherein said input switching apparatus includes
a display unit,
icon display means for displaying, for each of said input terminals, an icon indicating type of the video signal supplied to the input terminal, superposed on the video signal at a specific position, which is assigned to each of the icons, on said display unit,
selective input means for receiving, as an input, said video signal supplied to that one of said input terminals which corresponds to an icon selected based on an external instruction, among said icons displayed by said icon display means, and
video display means for processing said video signal input from said selective input means and for displaying a video image based on the processed said video signal on the display unit; and
said icon display means includes
rearranging means for rearranging said icons displayed on said display unit based on an external operation instruction;
said icon indicates a type of said video signal and a shape of the corresponding one of said input terminals; and
every time an input switching instruction is input externally, said icons of said plurality of input terminals are switched successively and displayed at the specific position on said display unit.

2. An input switching apparatus for selectively switching, among video signals supplied to respective ones of a plurality of input terminals, a desired one of said video signals to be input, comprising:
a display unit;
picture display means for displaying, for each of said input terminals, a picture indication type of the video signal supplied to the input terminal, superposed on the video signal at a specific position, which is assigned to each of the icons, on said display unit;
selective input means for receiving, as an input, said video signal supplied to that one of said input terminals which corresponds to a picture selected based on an external instruction, among said pictures displayed by said picture display means; and
video display means for processing said video signal input from said selective input means and displaying a video image based on the processed said video signal on the display unit;
wherein said picture display means includes
rearranging means for rearranging said pictures displayed on said display unit based on an external operation instruction, wherein said picture indicates a type of said video signal and a shape of the corresponding one of said input terminals, and wherein every time an input switching instruction is input externally, said pictures of said plurality of input terminals are switched successively and displayed on said display unit.

3. The input switching apparatus according to claim 2, wherein said input switching apparatus is provided in a television apparatus.

4. The input switching apparatus according to claim 2, wherein said picture is displayed as an icon.

* * * * *